United States Patent
Shah et al.

(10) Patent No.: US 8,671,072 B1
(45) Date of Patent: Mar. 11, 2014

(54) SYSTEM AND METHOD FOR HIJACKING INODES BASED ON REPLICATION OPERATIONS RECEIVED IN AN ARBITRARY ORDER

(75) Inventors: Devang K. Shah, San Jose, CA (US); Alan S. Driscoll, Fremont, CA (US)

(73) Assignee: NetApp, Inc., Sunnyvale, CA (US)

( * ) Notice: Subject to any disclaimer, the term of this patent is extended or adjusted under 35 U.S.C. 154(b) by 353 days.

(21) Appl. No.: 12/559,483

(22) Filed: Sep. 14, 2009

(51) Int. Cl.
*G06F 17/30* (2006.01)

(52) U.S. Cl.
USPC .......................................................... 707/610

(58) Field of Classification Search
USPC .......................................................... 707/610
See application file for complete search history.

(56) References Cited

U.S. PATENT DOCUMENTS

| | | | |
|---|---|---|---|
| 5,504,861 A | 4/1996 | Crockett et al. | |
| 5,592,618 A | 1/1997 | Micka et al. | |
| 5,657,440 A | 8/1997 | Micka et al. | |
| 5,682,513 A | 10/1997 | Candelaria et al. | |
| 5,812,773 A * | 9/1998 | Norin | 709/204 |
| 5,819,292 A | 10/1998 | Hitz et al. | |
| 6,144,999 A | 11/2000 | Khalidi et al. | |
| 6,373,410 B2 * | 4/2002 | Ishikura et al. | 341/61 |
| 6,502,205 B1 | 12/2002 | Yanai et al. | |
| 6,539,396 B1 | 3/2003 | Bowman-Amuah | |
| 6,711,693 B1 | 3/2004 | Golden et al. | |
| 6,725,342 B1 | 4/2004 | Coulson | |
| 6,842,825 B2 | 1/2005 | Geiner et al. | |
| 6,993,539 B2 * | 1/2006 | Federwisch et al. | 1/1 |
| 7,028,147 B2 | 4/2006 | Wu et al. | |
| 7,136,882 B2 | 11/2006 | Collins et al. | |
| 7,152,077 B2 | 12/2006 | Veitch et al. | |
| 7,152,120 B2 | 12/2006 | Yamagami | |
| 7,203,732 B2 | 4/2007 | McCabe et al. | |
| 7,237,076 B2 * | 6/2007 | Nakano et al. | 711/162 |
| 7,243,115 B2 * | 7/2007 | Manley et al. | 1/1 |
| 7,293,137 B2 | 11/2007 | Factor et al. | |
| 7,302,634 B2 | 11/2007 | Lucovsky | |
| 7,325,109 B1 | 1/2008 | Muppalaneni et al. | |

(Continued)

FOREIGN PATENT DOCUMENTS

EP 1617330 A2 1/2006

OTHER PUBLICATIONS

Co-pending U.S. Appl. No. 12/187,305, filed Aug. 6, 2008
Co-pending U.S. Appl. No. 12/433,871, filed Apr. 30, 2009.

(Continued)

*Primary Examiner* — Joshua Bullock
(74) *Attorney, Agent, or Firm* — Perkins Coie LLP

(57) ABSTRACT

A system and method for hijacking inodes based on replication operations received in an arbitrary order is used to assist a data replication operation from a source storage system to a destination storage system. The source storage system generates a set of replication operations as part of a replication process and transmits the replication operations in an arbitrary order. After receiving a replication operation, the system determines whether the operation is inconsistent with a corresponding destination inode. If an inconsistency exists, the system hijacks the destination inode by replacing the destination inode's metadata with data determined based on the replication operation. The system may also delete metadata from the inode and/or initialize metadata to default values if the metadata was not replaced based on the replication operation. The system then waits for a second replication operation that contains the remaining metadata and replaces the metadata based on the second replication operation. In addition, data blocks associated with the previous version of the inode are freed.

22 Claims, 8 Drawing Sheets

(56) References Cited

U.S. PATENT DOCUMENTS

| | | | |
|---|---|---|---|
| 7,376,796 B2* | 5/2008 | Corbett et al. | 711/141 |
| 7,386,676 B2* | 6/2008 | Ahmad et al. | 711/141 |
| 7,467,265 B1 | 12/2008 | Tawri et al. | |
| 7,539,976 B1 | 5/2009 | Ousterhout et al. | |
| 7,562,077 B2 | 7/2009 | Bisson et al. | |
| 7,571,268 B2 | 8/2009 | Kern et al. | |
| 7,606,841 B1 | 10/2009 | Ranade | |
| 7,624,109 B2 | 11/2009 | Testardi | |
| 7,634,594 B1 | 12/2009 | Bezbaruah et al. | |
| 7,653,668 B1 | 1/2010 | Shelat et al. | |
| 7,814,074 B2 | 10/2010 | Anglin et al. | |
| 7,818,495 B2 | 10/2010 | Tanaka et al. | |
| 7,885,923 B1* | 2/2011 | Tawri et al. | 707/610 |
| 7,900,003 B2 | 3/2011 | Ben-Yehuda et al. | |
| 7,925,629 B2 | 4/2011 | Webman et al. | |
| 7,937,371 B2 | 5/2011 | Bates et al. | |
| 7,984,022 B2 | 7/2011 | Cannon et al. | |
| 7,996,371 B1 | 8/2011 | Deshmukh | |
| 8,099,571 B1 | 1/2012 | Driscoll et al. | |
| 8,150,800 B2 | 4/2012 | Webman et al. | |
| 8,290,899 B2 | 10/2012 | Webman et al. | |
| 8,321,380 B1 | 11/2012 | Leverett | |
| 2002/0039370 A1 | 4/2002 | Elliot | |
| 2003/0018878 A1 | 1/2003 | Dorward et al. | |
| 2003/0065873 A1 | 4/2003 | Collins et al. | |
| 2003/0101223 A1 | 5/2003 | Pace et al. | |
| 2003/0177154 A1 | 9/2003 | Vrancic | |
| 2003/0182313 A1* | 9/2003 | Federwisch et al. | 707/200 |
| 2003/0182325 A1 | 9/2003 | Manley et al. | |
| 2003/0204692 A1 | 10/2003 | Tamer et al. | |
| 2004/0030703 A1 | 2/2004 | Bourbonnais et al. | |
| 2004/0030837 A1 | 2/2004 | Geiner et al. | |
| 2004/0039774 A1 | 2/2004 | Xu et al. | |
| 2004/0139367 A1 | 7/2004 | Boyd et al. | |
| 2004/0186968 A1 | 9/2004 | Factor et al. | |
| 2004/0205372 A1 | 10/2004 | Moser et al. | |
| 2004/0250029 A1 | 12/2004 | Ji et al. | |
| 2004/0260736 A1 | 12/2004 | Kern et al. | |
| 2005/0015413 A1 | 1/2005 | Teodosiu et al. | |
| 2005/0050115 A1 | 3/2005 | Kekre | |
| 2005/0055357 A1 | 3/2005 | Campbell | |
| 2005/0071708 A1 | 3/2005 | Bartfai et al. | |
| 2005/0097260 A1 | 5/2005 | McGovern et al. | |
| 2005/0144202 A1 | 6/2005 | Chen | |
| 2005/0154786 A1 | 7/2005 | Shackelford | |
| 2005/0278382 A1 | 12/2005 | LaRocca et al. | |
| 2006/0006918 A1 | 1/2006 | Saint-Laurent | |
| 2006/0015507 A1 | 1/2006 | Butterworth et al. | |
| 2006/0059322 A1 | 3/2006 | Poston | |
| 2006/0095480 A1* | 5/2006 | Vaughn et al. | 707/204 |
| 2006/0106895 A1* | 5/2006 | Vaughn et al. | 707/204 |
| 2006/0168402 A1 | 7/2006 | Ahmad et al. | |
| 2006/0173985 A1 | 8/2006 | Moore | |
| 2006/0200761 A1 | 9/2006 | Judd et al. | |
| 2006/0271727 A1 | 11/2006 | Wang et al. | |
| 2007/0011281 A1 | 1/2007 | Jhoney et al. | |
| 2007/0022264 A1 | 1/2007 | Bromling et al. | |
| 2007/0094466 A1 | 4/2007 | Sharma et al. | |
| 2007/0118687 A1 | 5/2007 | McGovern et al. | |
| 2007/0165549 A1 | 7/2007 | Surek et al. | |
| 2007/0168633 A1 | 7/2007 | English et al. | |
| 2007/0174687 A1 | 7/2007 | Graham et al. | |
| 2007/0185937 A1* | 8/2007 | Prahlad et al. | 707/204 |
| 2007/0185938 A1* | 8/2007 | Prahlad et al. | 707/204 |
| 2007/0208790 A1 | 9/2007 | Reuter et al. | |
| 2007/0208839 A1 | 9/2007 | Voigt et al. | |
| 2007/0214194 A1 | 9/2007 | Reuter | |
| 2007/0239950 A1 | 10/2007 | Kern et al. | |
| 2007/0256055 A1* | 11/2007 | Herscu | 717/115 |
| 2007/0288708 A1 | 12/2007 | Saha et al. | |
| 2008/0077762 A1 | 3/2008 | Scott et al. | |
| 2008/0162594 A1 | 7/2008 | Poston | |
| 2008/0243950 A1 | 10/2008 | Webman et al. | |
| 2008/0243951 A1 | 10/2008 | Webman et al. | |
| 2008/0243952 A1 | 10/2008 | Webman et al. | |
| 2008/0288646 A1 | 11/2008 | Hasha et al. | |
| 2010/0049753 A1 | 2/2010 | Prahlad et al. | |
| 2010/0169275 A1 | 7/2010 | Chen et al. | |
| 2010/0250497 A1* | 9/2010 | Redlich et al. | 707/661 |
| 2011/0040728 A1 | 2/2011 | Akirav et al. | |

OTHER PUBLICATIONS

Co-pending U.S. Appl. No. 12/713,744, filed Feb. 26, 2010.
Co-pending U.S. Appl. No. 11/692,663, filed Mar. 28, 2007.
Co-pending U.S. Appl. No. 11/692,668, filed Mar. 28, 2007.
Co-pending U.S. Appl. No. 11/692,659, filed Mar. 28, 2007.
Chutani, et al. "The Episode File System", Proc.1992 Winter USENIX Conference, pp. 43-60 (1992).
Howard, et al., "Scale and Performance in a Distributed Filed System", ACM Transactions on Computer Systems, vol. 6, No. 1, Feb. 1988, pp. 51-81.
Mills, D.L. "Network Time Protocol (Version 3) Specification, Implementation and Analysis," Network Working Group, XP002935527, Mar. 1, 1992, pp. 1-v11 and 1-133.
Bob Sidebotham, "Volumes: The Andrew File System Data Structuring Primitive", EUUG Conference Proceedings Manchester, United Kingdom, pp. 1-8, Autumn 1986.
International Search Report PCT/US2008/003554 Dated Aug. 26, 2008, pp. 1-3.
Written Opinion PCT/US2008/003554 Dated Aug. 26, 2008, pp. 1-6.
International Search Report PCT/US2008/003612 Dated Nov. 5, 2008, pp. 1-3.
Written Opinion PCT/US2008/003612 Dated Nov. 5, 2008, pp. 1-8.
International Search Report PCT/US2008/003692 Dated Nov. 5, 2008, pp. 1-3.
Written Opinion PCT/US2008/003692 Dated Nov. 5, 2008, pp. 1-8.
Non-Final Office Action Mailed Mar. 1, 2010 in Co-Pending U.S. Appl. No. 11/692,666, filed Mar. 28, 2007.
Final Office Action Mailed Aug. 27, 2009 in Co-Pending U.S. Appl. No. 11/692,666, filed Mar. 28, 2007.
Non-Final Office Action Mailed Apr. 1, 2009 in Co-Pending U.S. Appl. No. 11/692,666, filed Mar. 28, 2007.
Co-pending U.S. Appl. No. 11/692,683, filed Mar. 28, 2007.
Co-pending U.S. Appl. No. 12/610,231, filed Oct. 30, 2009.
Co-pending U.S. Appl. No. 12/610,234, filed Oct. 30, 2009.
Final Office Action Mailed Aug. 27, 2009 in Co-Pending U.S. Appl. No. 11/692,668, filed Mar. 28, 2007.
Non-Final Office Action Mailed Apr. 1, 2009 in Co-Pending U.S. Appl. No. 11/692,668, filed Mar. 28, 2007.
Non-Final Office Action Mailed Jul. 21, 2010 in Co-Pending U.S. Appl. No. 11/692,683, filed Mar. 28, 2007.
Non-Final Office Action Mailed Mar. 1, 2010 in Co-Pending U.S. Appl. No. 11/692,668, filed Mar. 28, 2007.
Non-Final Office Action Mailed Sep. 10, 2010 in Co-Pending U.S. Appl. No. 11/692,668, filed Mar. 28, 2007.
Notice of Allowance Mailed Jul. 22, 2010 in Co-Pending U.S. Appl. No. 11/692,668, filed Mar. 28, 2007.
Final Office Action Mailed Feb. 23, 2012 in Co-Pending U.S. Appl. No. 12/713,744 of Leverett, B., et al., filed Feb. 26, 2010.
Freeman, et al., "Configuring NetApp Deduplication with LUN's," http:/communities.netapp.com/docs/DOC-1192, pp. 1-7, May 22, 2008.
Notice of Allowance Mailed Aug. 26, 2011 in Co-Pending U.S. Appl. No. 11/692,659 of Webman, E., et al., filed Mar. 28, 2007.
Advisory Action Mailed Aug. 1, 2011 in Co-Pending U.S. Appl. No. 11/692,659 of Webman, E., et al., filed Mar. 28, 2007.
Final Office Action Mailed Apr. 26, 2011 in Co-Pending U.S. Appl. No. 11/692,659 of Webman, E., et al., filed Mar. 28, 2007.
Non-Final Office Action Mailed Oct. 27, 2010 in Co-Pending U.S. Appl. No. 11/692,659 of Webman, E., et al., filed Mar. 28, 2007.
Final Office Action Mailed Nov. 9, 2010 in Co-Pending U.S. Appl. No. 11/692,683 of Webman, E., et al., filed Mar. 28, 2007.
Non-Final Office Action Mailed Sep. 15, 2011 in Co-Pending U.S. Appl. No. 12/713,744 of Leverett, B., et al., filed Feb. 26, 2010.
Non-Final Office Action Mailed Jul. 27, 2011 in Co-Pending U.S. Appl. No. 12/433,871 of Leverett, B., filed Apr. 30, 2009.

(56) References Cited

OTHER PUBLICATIONS

Notice of Allowance Mailed Dec. 23, 2010 in Co-Pending U.S. Appl. No. 11/692,668 of Webman, E. filed Mar. 28, 2007.
Notice of Allowance mailed Aug. 17, 2011 in Co-Pending U.S. Appl. No. 12/187,305 of Driscoll, A.S., et al., filed Aug. 6, 2008.
Non-Final Office Action Mailed Oct. 27, 2011 in Co-Pending U.S. Appl. No. 12/610,231 of Condict, M.N., et al., filed Oct. 30, 2009.
Notice of Allowance mailed Nov. 15, 2011 in Co-Pending U.S. Appl. No. 12/187,305 of Driscoll, A.S., et al., filed Aug. 6, 2008.
Notice of Allowance Mailed Nov. 17, 2011 in Co-Pending U.S. Appl. No. 11/692,659 of Webman, E., et al., filed Mar. 28, 2007.
Final Office Action Mailed Jan. 5, 2012 in Co-Pending U.S. Appl. No. 12/433,871 of Leverett, B., filed Apr. 30, 2009.
Non-Final Office Action Mailed Dec. 27, 2011 in Co-Pending U.S. Appl. No. 11/692,683 of Webman, E., et al., filed Mar. 28, 2007.
Birman, K., et al., "Lightweight Casual and Atomic Group Multicast", ACM Transactions on Computer Systems, vol. 9, No. 3, Aug. 1991, pp. 272-314.
Final Office Action Mailed Jan. 17, 2013 in Co-Pending U.S. Appl. No. 12/713,744 of Leverett, B., et al., filed Feb. 26, 2010.
Advisory Action Mailed Mar. 27, 2012 in Co-Pending U.S. Appl. No. 12/433,871 of Leverett, B., filed Apr. 30, 2009.
Restriction Requirement Mailed Jul. 6, 2010 in Co-Pending U.S. Appl. No. 11/692,659 of Webman, E., et al., filed Mar. 28, 2007.
Non-Final Office Action Mailed Jun. 15, 2012 in Co-Pending U.S. Appl. No. 12/610,234 of Condict, M.N., filed Oct. 30, 2009.
Notice of Allowance Mailed Jun. 7, 2012 in Co-Pending U.S. Appl. No. 11/692,683 of Webman, E., et al., filed Mar. 28, 2007.
Final Office Action Mailed Jun. 28, 2012 in Co-Pending U.S. Appl. No. 12/610,231 of Condict, M.N., et al., filed Oct. 30, 2009.
Notice of Allowance Mailed Jun. 28, 2012 in Co-Pending U.S. Appl. No. 12/433,871 of Leverett, B., filed Apr. 30, 2009.
Non-Final Office Action Mailed Aug. 3, 2012 in Co-Pending U.S. Appl. No. 12/713,744 of Leverett, B., et al., filed Feb. 26, 2010.
Advisory Action Mailed May 7, 2012 in Co-Pending U.S. Appl. No. 12/713,744 of Leverett, B., et al., filed Feb. 26, 2010.
Advisory Action Mailed Sep. 5, 2012 in Co-Pending U.S. Appl. No. 12/610,231 of Condict, M.N., et al., filed Oct. 30, 2009.
Notice of Allowance Mailed Sep. 24, 2012 in Co-Pending U.S. Appl. No. 12/433,871 of Leverett, B., filed Apr. 30, 2009.

* cited by examiner

SYSTEM AND METHOD FOR HIJACKING INODES BASED ON REPLICATION OPERATIONS RECEIVED IN AN ARBITRARY ORDER

BACKGROUND

A network storage system is a processing system that is used to store and retrieve data on behalf of one or more hosts on a network. A storage system operates on behalf of one or more hosts to store and manage data in a set of mass storage devices, such as magnetic or optical storage-based disks or tapes. Some storage systems are designed to service file-level requests from hosts, as is commonly the case with file servers used in a network attached storage (NAS) environment. Other storage systems are designed to service block-level requests from hosts, as with storage systems used in a storage area network (SAN) environment. Still other storage systems are capable of servicing both file-level requests and block-level requests, as is the case with certain storage servers made by NetApp, Inc. of Sunnyvale, Calif.

One common use of storage systems is data replication. Data replication is a technique for backing up data in which a given data set at a source is replicated at a destination that is often geographically remote from the source. The replica data set created at the destination storage system is called a "mirror" of the original data set on the source storage system. Typically replication involves the use of at least two storage systems, e.g., one at the source and another at the destination, which communicate with each other through a computer network or other type of data interconnect.

Each data block in a given set of data, such as a file in a storage system, can be represented by both a physical block, pointed to by a corresponding physical block pointer, and a logical block, pointed to by a corresponding logical block pointer. These two blocks are actually the same data block. However, the physical block pointer indicates the actual physical location of the data block on a storage medium, whereas the logical block pointer indicates the logical position of the data block within the data set (e.g., a file) relative to other data blocks.

In some replication systems, replication is done at a logical block level. In these systems, the replica at the destination storage system has the identical structure of logical block pointers as the original data set at the source storage system, but it may (and typically does) have a different structure of physical block pointers than the original data set at the source storage system. To execute a logical replication, the file system of the source storage system is analyzed to determine changes that have occurred to the file system. The changes are transferred to the destination storage system. This typically includes "walking" the directory trees at the source storage system to determine the changes to various file system objects within each directory tree, as well as identifying the changed file system object's location within the directory tree structure. The changes are then sent to the destination storage system in a certain order (e.g., directories before subdirectories, and subdirectories before files, etc.) so that the directory tree structure of the source storage system is preserved at the destination storage system. Updates to directories of the source file system are received and processed at the destination storage system before updates to the files in each of the directories can be received and processed.

A number of problems exist if the changes are received at the destination storage system in an order that is not consistent with the file system hierarchy. For example, if updates to data in files are received before the updates to the directories that contain the files, then the files are essentially "orphaned" because the destination storage system does not know which directory should be used to store the updates. That is, updates to the data in the file cannot be processed correctly before the directory referencing the file exists on the destination storage system. Similarly, if a file is deleted on the source storage system and a new directory is created at the same file system address, the replication system will send one message indicating the delete operation and another message indicating the create operation. If the messages are received out of order, the destination system will be directed to create a directory at a file system location that already contains a file, resulting in an error condition. In another case, if a file is created at an unused file system address and then modified, the replication system will send a first message indicating the create operation and a second operation indicating the modify operation. If the messages are received out of order, the destination system will be directed to modify a file at an unused file system location, resulting in an error condition.

SUMMARY

The present disclosure is directed to an apparatus and method for hijacking inodes based on file system replication operations (hereinafter referred to as "replication operations") received in an arbitrary order. The replication operations may be received at a destination storage system from a source storage system as part of a replication process. The order in which the replication operations are received is referred to as "arbitrary" because the order is not restricted by chronological order, file system hierarchy, or any other ordering requirement. After receiving a replication operation, the system determines an inode (i.e., a metadata container) on the destination storage system that the replication operation is intended to modify or replace (referred to as the "destination inode"). The system then looks for an inconsistency between the replication operation and the destination inode based on the type of the operation or by comparing the destination inode's metadata to the data in the replication operation. If an inconsistency is detected, the system determines that the replication operation is a replacement operation. As used herein, a "replacement operation" is a type of replication operation that is received in a chronologically different order from the order the corresponding change occurred on the source storage system and must be handled specially. In response to detecting the replacement operation, the system "hijacks" the destination inode; i.e., in response to the inconsistency, it replaces at least a part of the inode's metadata contents based on the replication operation. In some cases, the replication operation does not include enough information to fully populate the destination inode's metadata. In these cases, the system deletes metadata that was not replaced and/or initializes the metadata to default values and waits for a second replication operation that contains the remaining metadata. The system also frees any data blocks associated with the previous version of the inode. Freeing data blocks means removing references to the data blocks in the destination inode and may also include making the data blocks available to be written to.

By detecting inconsistencies and hijacking the destination inode, where appropriate, the hijack system enables the replication process to function without requiring replication operations to be sent in a particular order. Thus, the hijack system avoids the problems discussed above, which occur when the replication system is required to transmit changes based on the file system hierarchy. According to the system introduced here, inconsistent operations are detected before they are applied to the file system of the destination storage system. The system then modifies the destination inode in place, without having to wait for a delete (or create) operation to be provided. Thus, the system avoids the need for the destination storage system to buffer replication operations to wait for other related operations to arrive. As a result, when the delete operation is later received, the system can ignore the operation, reducing the number of operations that the destination storage system has to execute during a replication. Alternatively, the source storage system may omit transmitting the delete operations entirely. This reduces processing on the source storage system and network bandwidth on the interconnect between the storage systems. The hijack system can also partially initialize an inode based on a first out-of-order operation and complete the initialization when a later replication operation is received, such as when create and modify operations for a particular inode are received out of order.

DETAILED DESCRIPTION

A system and method for hijacking inodes based on replication operations received in an arbitrary order is disclosed (hereinafter referred to as "the hijack system" or "the system"). The system may be used to assist a data replication process from a source storage system to a destination storage system. The source storage system determines a set of changes made between two points in time and transmits replication operations based on the changes in an arbitrary order. Each replication operation specifies type of operation (e.g., create, modify, delete) and related information, including a target inode number for the operation. The target inode number identifies the inode of the logical data container (e.g., file, directory, or logical unit number (LUN)) that is the target of the replication operation.

When the system receives a replication operation, it looks up a destination inode corresponding to the target inode number in the replication operation. The system then determines whether the replication operation is inconsistent with the destination inode. This may be determined based on the type of operation or by comparing data in the replication operation to the destination inode's metadata. For example, an inconsistency exists if the replication operation is directed to a first inode type while the target inode has a second inode type. Similarly, an inconsistency exists if the replication operation is a modify operation that is directed to an unused inode (i.e., an inode that is not associated with a file system object). An inconsistency also exists if the replication operation specifies an inode generation number (defined below) that differs from the destination inode's generation number.

If an inconsistency exists, the system determines that the replication operation is a replacement operation. In response to determining that the replication operation is a replacement operation, the system hijacks the destination inode by replacing the destination inode's metadata with data determined based on the replication operation. As a part of this process, the system frees data blocks previously associated with the destination inode and replaces the metadata. The system may also change the generation number and/or type of the inode. In some cases, the replication operation does not include enough information to fully populate the destination inode's metadata. In these cases, the system deletes metadata that was not replaced and waits for a second replication operation that contains the remaining metadata. The system may also initialize some or all of the deleted metadata to default values (e.g., zero or null values).

Figure 1:
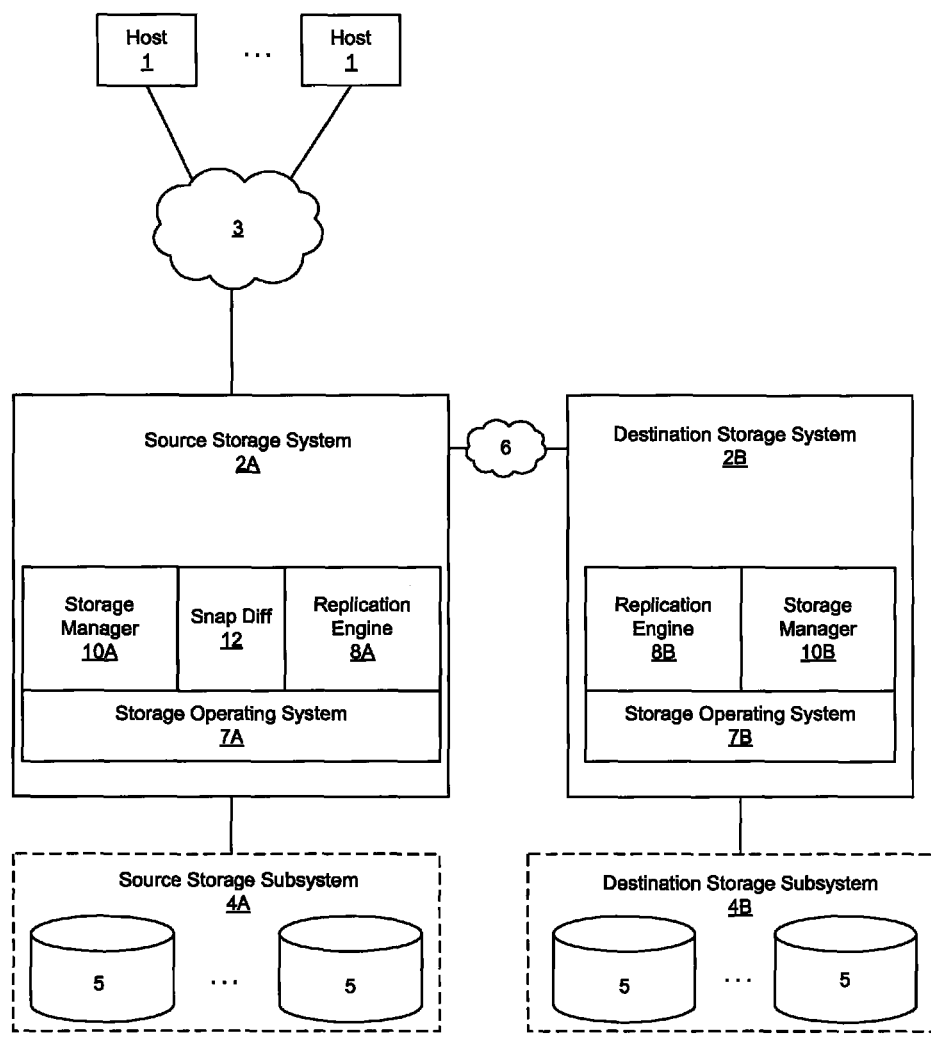
FIG. 1 is a network environment in which multiple network storage systems cooperate.

FIG. 1 depicts a configuration of network storage systems in which the techniques being introduced here can be implemented according to an illustrative embodiment. In FIG. 1, a source storage system 2A is coupled to a source storage subsystem 4A and to a set of hosts 1 through an interconnect 3. The interconnect 3 may be, for example, a local area network (LAN), a wide area network (WAN), a metropolitan area network (MAN), a global area network such as the Internet, a Fibre Channel fabric, or any combination of such interconnects. Each of the hosts 1 may be, for example, a conventional personal computer (PC), server-class computer, workstation, handheld computing/communication device, or other computing/communications device.

In one embodiment, the source storage system 2A includes a storage operating system 7A, a storage manager 10A, a snapshot differential module 12, and a source replication engine 8A. Each of the storage operating system 7A, the storage manager 10A, the snapshot differential module 12, and the source replication engine 8A are computer hardware components of the storage system, which can be implemented as special purpose hardware circuitry (e.g., "hardwired"), general purpose hardware circuitry that is programmed with software and/or firmware, or any combination thereof. Storage of data in the source storage subsystem 4A is managed by the storage manager 10A of the source storage system 2A. The source storage system 2A and the source storage subsystem 4A are collectively referred to as a source storage system. The storage manager 10A receives and responds to various read and write requests from the hosts 1, directed to data stored in or to be stored in the source storage subsystem 4A. The storage manager 10A may be implemented as a part of the storage operating system 7A or as a separate component, as shown in FIG. 1. The source storage subsystem 4A includes a number of nonvolatile mass storage devices 5, which can be, for example, magnetic disks, optical disks, tape drives, solid-state memory, such as flash memory, or any combination of such devices. The mass storage devices 5 in the source storage subsystem 4A can be organized as a RAID group, in which case the source storage system 2A can access the source storage subsystem 4A using a conventional RAID algorithm for redundancy.

The storage manager 10A processes write requests from the hosts 1 and stores data to unused storage locations in the mass storage devices 5 of the source storage subsystem 4A. In one embodiment, the storage manager 10A implements as a "write anywhere" file system such as the proprietary Write Anywhere File Layout (WAFL™) file system developed by Network Appliance, Inc., Sunnyvale, Calif. Such a file system is not constrained to write any particular data or metadata to a particular storage location or region. Rather, such a file system can write to any unallocated block on any available mass storage device and does not overwrite data on the devices. If a data block on disk is updated or modified with new data, the data block is thereafter stored (written) to a new location on disk instead of modifying the block in place to optimize write performance.

The storage manager 10A of the source storage system 2A is responsible for managing storage of data in the source storage subsystem 4A, servicing requests from the hosts 1, and performing various other types of storage-related operations. In one embodiment, the storage manager 10A, the source replication engine 8A, and the snapshot differential module 12 are logically on top of the storage operating system 7A. The source replication engine 8A operates in cooperation with a remote destination replication engine 8B, described below, to perform logical replication of data stored in the source storage subsystem 4A. Note that in other embodiments, one or more of the storage manager 10A, the source replication engine 8A and the snapshot differential module 12 may be implemented as elements within the storage operating system 7A.

The source storage system 2A is connected to a destination storage system 2B through an interconnect 6, for purposes of replicating data. Although illustrated as a direct connection, the interconnect 6 may include one or more intervening devices and/or may include one or more networks. In the illustrated embodiment, the destination storage system 2B includes a storage operating system 7B, the destination replication engine 8B and a storage manager 10B. The storage manager 10B controls storage-related operations on the destination storage system 2B. In one embodiment, the storage manager 10B and the destination replication engine 8B are logically on top of the storage operating system 7B. In other embodiments, the storage manager 10B and the destination replication engine 8B may be implemented as elements within the storage operating system 7B. The destination storage system 2B and the destination storage subsystem 4B are collectively referred to as the destination storage system.

The destination replication engine 8B works in cooperation with the source replication engine 8A to replicate data from the source storage system to the destination storage system. In certain embodiments, the storage operating systems 7A and 7B, replication engines 8A and 8B, storage managers 10A and 10B, and snapshot differential module 12 are all implemented in the form of software. In other embodiments, however, any one or more of these elements may be implemented in hardware alone (e.g., specially designed dedicated circuitry), firmware, or any combination of hardware, software and firmware.

The storage systems 2A and 2B each may be, for example, a storage system that provides file-level data access services to the hosts 1, such as commonly done in a NAS environment, or block-level data access services, such as commonly done in a SAN environment, or each may be capable of providing both file-level and block-level data access services to the hosts 1. Further, although the storage systems 2 are illustrated as monolithic systems in FIG. 1, they can have a distributed architecture. For example, the storage systems 2 each can be designed as physically separate network modules (e.g., "N-module") and data modules (e.g., "D-module") (not shown), which communicate with each other over a physical interconnect. Such an architecture allows convenient scaling, such as by deploying two or more N-modules and D-modules, all capable of communicating with each other over the interconnect.

Figure 2:
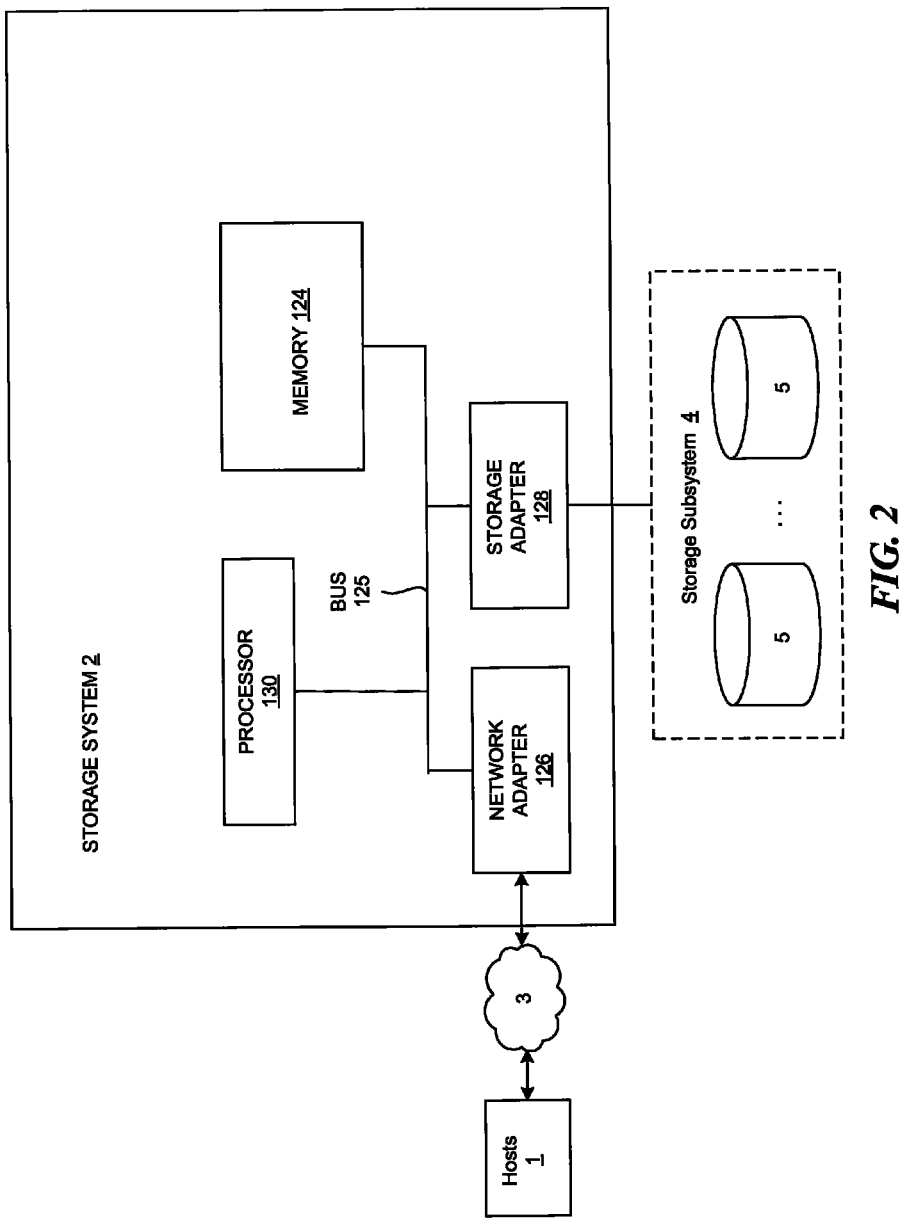
FIG. 2 is an example of the hardware architecture of a storage system.

FIG. 2 is a high-level block diagram of an illustrative embodiment of a storage system 2. The storage system 2 includes one or more processors 130 and a memory 124 coupled to an interconnect bus 125. The interconnect bus 125 shown in FIG. 2 is an abstraction that represents any one or more separate physical interconnect buses, point-to-point connections, or both, connected by appropriate bridges, adapters, and/or controllers. The interconnect bus 125, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

The processor(s) 130 is/are the central processing unit(s) (CPU) of the storage systems 2 and, therefore, control the overall operation of the storage systems 2. In certain embodiments, the processor(s) 130 accomplish this by executing software or firmware stored in the memory 124. The processor(s) 130 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices. The memory 124 is or includes the main memory of the storage systems 2.

The memory 124 represents any form of random access memory (RAM), read-only memory (ROM), flash memory, or the like, or any combination of such devices. Also connected to the processor(s) 130 through the interconnect bus 125 is a network adapter 126 and a storage adapter 128. The network adapter 126 provides the storage systems 2 with the ability to communicate with remote devices, such as the hosts 1, over the interconnect 3 of FIG. 1, and may be, for example, an Ethernet adapter or Fibre Channel adapter. The storage adapter 128 allows the storage systems 2 to access storage subsystems 4A or 4B, and may be, for example, a Fibre Channel adapter or SCSI adapter.

Figure 3:
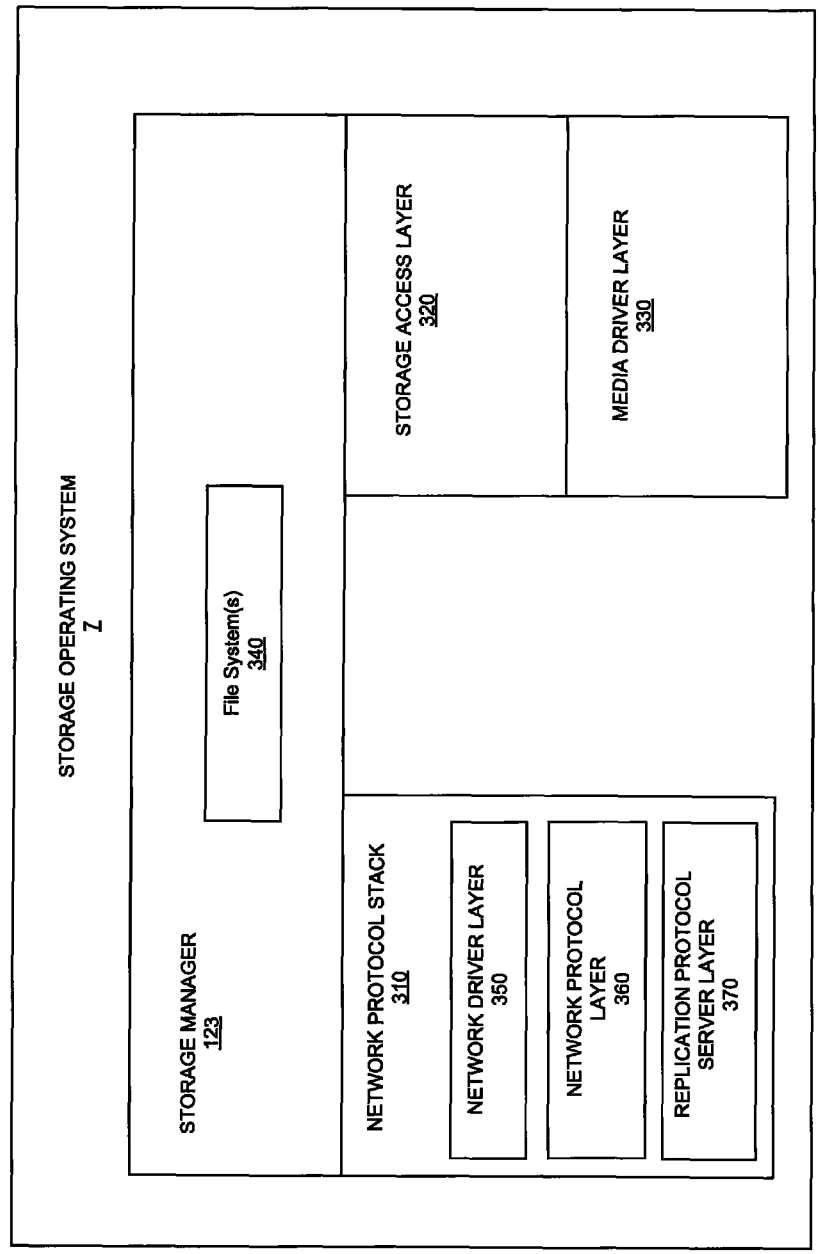
FIG. 3 is a block diagram of a storage operating system.

FIG. 3 is a block diagram of a storage operating system according to an illustrative embodiment. As used herein, the term "storage operating system" generally refers to the computer-executable code operable on a computer to perform a storage function that manages data access and other related functions. Storage operating system 7 can be implemented as a microkernel, an application program operating over a general-purpose operating system such as UNIX® or Windows NT®, or as a general-purpose operating system configured for the storage applications as described herein. In the illustrated embodiment, the storage operating system includes a network protocol stack 310 having a series of software layers including a network driver layer 350 (e.g., an Ethernet driver), a network protocol layer 360 (e.g., an Internet Protocol layer and its supporting transport mechanisms: the TCP layer and the User Datagram Protocol layer), and a file system protocol server layer 370 (e.g., a CIFS server, a NFS server, etc.). In addition, the storage operating system 7 includes a storage access layer 320 that implements a storage media protocol such as a RAID protocol, and a media driver layer 330 that implements a storage media access protocol such as, for example, a Small Computer Systems Interface (SCSI) protocol. Any and all of the modules of FIG. 3 can be implemented as a separate hardware component. For example, the storage access layer 320 may alternatively be implemented as a parity protection RAID module and embodied as a separate hardware component such as a RAID controller. Bridging the storage media software layers with the network and file system protocol layers is the storage manager 10 that implements one or more file system(s) 340. For the purposes of this disclosure, a file system is a structured (e.g., hierarchical) set of stored files, directories, and/or other data containers. In one embodiment, the storage manager 10 implements data layout algorithms that improve read and write performance to the mass storage devices 5, such as WAFL systems discussed above.

Figure 4:
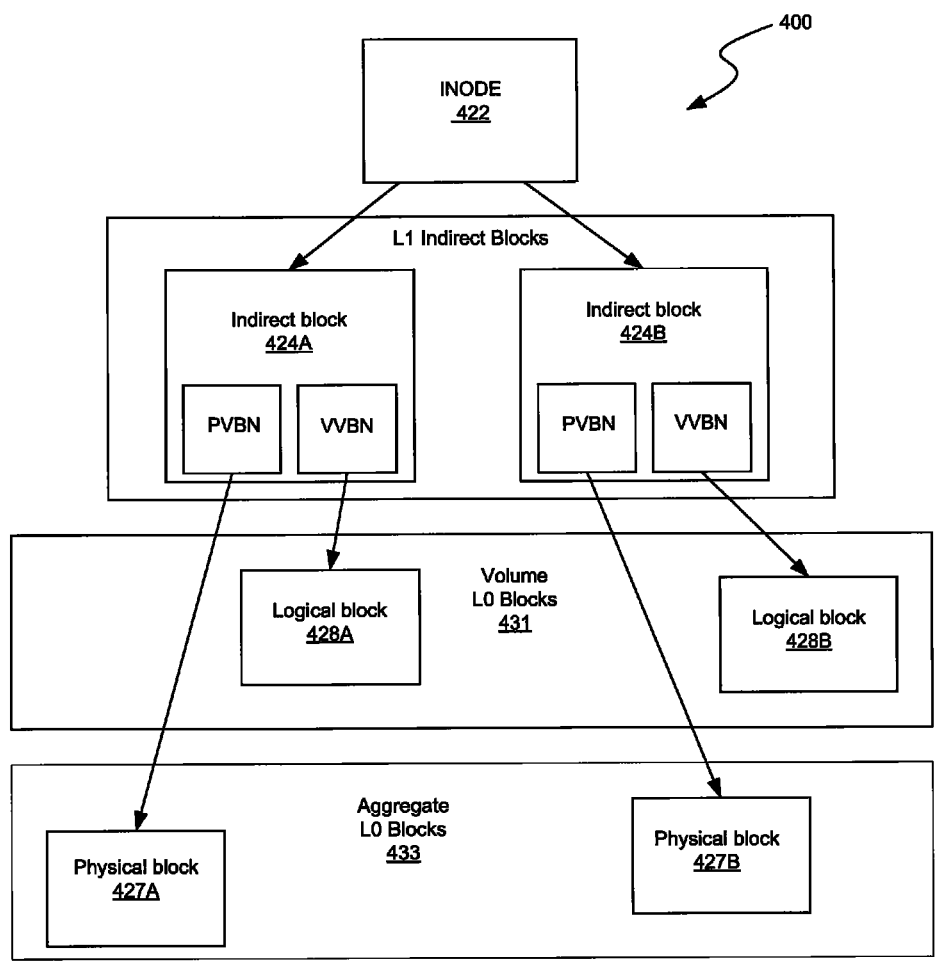
FIG. 4 depicts a buffer tree of a file.
Figure 5:
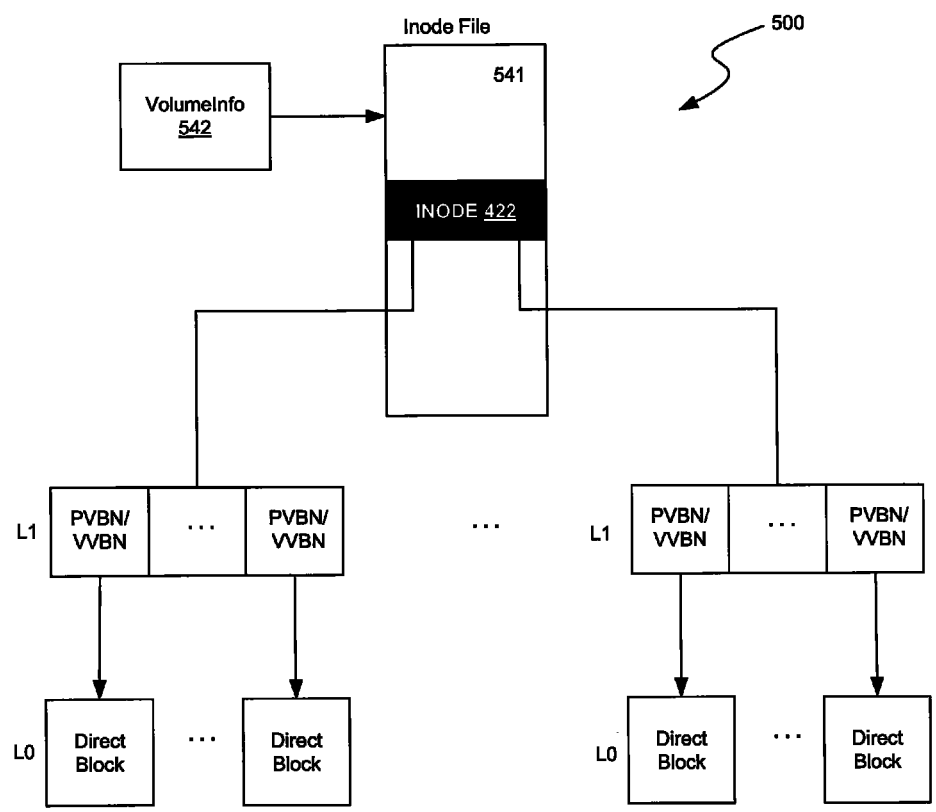
FIG. 5 depicts a buffer tree including an inode file.

It is useful now to consider how data can be structured and organized by storage systems 2A and 2B in certain embodiments. Reference is now made to FIGS. 4 and 5 in this regard. In at least one embodiment, data is stored in the form of volumes, where each volume contains one or more directories, subdirectories, and/or files. The term "aggregate" is used to refer to a pool of physical storage, that combines one or more physical mass storage devices (e.g., disks) or parts thereof, into a single storage object. An aggregate also contains or provides storage for one or more other data sets at a higher level of abstraction, such as volumes. A "volume" is a set of stored data associated with a collection of mass storage devices, such as disks, which obtains its storage from (i.e., is contained within) an aggregate, and which is managed as an independent administrative unit, such as a complete file system. A volume includes one or more file systems, such as an active file system and, optionally, one or more persistent point-in-time images of the active file system captured at various instances in time. A "file system" is an independently managed, self-contained, organized structure of data units (e.g., files, blocks, or LUNs). Although a volume or file system (as those terms are used herein) may store data in the form of files, that is not necessarily the case. That is, a volume or file system may store data in the form of other units of data, such as blocks or LUNs.

In certain embodiments, each aggregate uses a physical volume block number (PVBN) space that defines the physical storage space of blocks provided by the storage devices of the physical volume, and likewise, each volume uses a virtual volume block number (VVBN) space to organize those blocks into one or more higher-level objects, such as directories, subdirectories, and files. A PVBN, therefore, is an address of a physical block in the aggregate, and a VVBN is an address of a block in a volume (the same block as referenced by the corresponding PVBN), i.e., the offset of the block within the volume. The storage manager 10 tracks information for all of the VVBNs and PVBNs in each storage system 2. The storage manager 10 may manage multiple volumes on a common set of physical storage in the aggregate.

In addition, data within the storage system is managed at a logical block level. At the logical block level, the storage manager maintains a logical block number (LBN) for each data block. If the storage system stores data in the form of files, the LBNs are called file block numbers (FBNs). Each FBN indicates the logical position of the block within a file, relative to other blocks in the file, i.e., the offset of the block within the file. For example, FBN 0 represents the first logical block in a particular file, while FBN 1 represents the second logical block in the file, and so forth. Note that the PVBN and VVBN of a data block are independent of the FBN(s) that refer to that block. In one embodiment, the FBN of a block of data at the logical block level is assigned to a PVBN-VVBN pair.

In certain embodiments, each file is represented in the storage system in the form of a hierarchical structure called a buffer tree. As used herein, the term "buffer tree" is defined as a hierarchical metadata structure containing references (or pointers) to logical blocks of data in the file system. A buffer tree is a hierarchical structure which is used to store file data as well as metadata about a file, including pointers for use in locating the data blocks for the file. A buffer tree includes one or more levels of indirect blocks (called "L1 blocks", "L2 blocks", etc.), each of which contains one or more pointers to lower-level indirect blocks and/or to the direct blocks (called "L0 blocks") of the file. All of the data in the file is stored only at the lowest level (L0) blocks. The root of a buffer tree is the "inode" of the file. An inode is a metadata container that is used to store metadata about the file, such as ownership, access permissions, file size, file type, and pointers to the highest level of indirect blocks for the file. Each file has its own inode. The inode is stored in a separate inode file, which may itself be structured as a buffer tree. In hierarchical (or nested) directory file systems, this essentially results in buffer trees within buffer trees, where subdirectories are nested within higher-level directories and entries of the directories point to files, which also have their own buffer trees of indirect and direct blocks. Directory entries include the name of a file in the file system, and directories are said to point to (reference) that file. Alternatively, a directory entry can point to another directory in the file system. In such a case, the directory with the entry is said to be the "parent directory," while the directory that is referenced by the directory entry is said to be the "child directory" or "subdirectory."

FIG. 4 depicts a buffer tree 400 of a file according to an illustrative embodiment. In the illustrated embodiment, a file is assigned an inode 422, which references Level 1 (L1) indirect blocks 424A and 424B. Each indirect block 424 stores at least one PVBN and a corresponding VVBN for each PVBN. There is a one-to-one mapping between each VVBN and PVBN. Note that a PVBN is a block number in an aggregate (i.e., offset from the beginning of the storage locations in an aggregate), and a VVBN is a block number in a volume (offset from the beginning of the storage locations in a volume); however, there is only one copy of the L0 data block physically stored in the physical mass storage of the storage system. Also, to simplify description, only one PVBN-VVBN pair is shown in each indirect block 424 in FIG. 4; however, an actual implementation would likely include multiple PVBN-VVBN pairs in each indirect block 424. Each PVBN references a physical block 427A and 427B, respectively, in the storage device (i.e., in the aggregate L0 blocks 433), and the corresponding VVBN references a logical block 428A and 428B, respectively, in the storage device (i.e., in volume L0 blocks 431). In addition, volumes can also be represented by files called "container files." In such a case, the VVBN references a block number offset from the beginning of the container file representing the volume. Physical blocks 427 and logical blocks 428 are actually the same L0 data for any particular PVBN-VVBN pair; however, they are accessed in different ways: the PVBN is accessed directly in the aggregate, while the VVBN is accessed virtually via the container file representing the volume.

FIG. 5 depicts a buffer tree 500 including an inode file 541 according to an illustrative embodiment. In FIG. 5, for each volume managed by the storage system 2, the inodes of the files and directories in that volume are stored in the inode file 541. A separate inode file 541 is maintained for each volume. The inode file 541, in one embodiment, is a data structure representing a master list of file system objects (e.g., directories, subdirectories and files) of the file system in the storage system and each inode entry identifies a particular file system object within the file system. Each inode 422 in the inode file 541 is the root of a buffer tree 400 of the file corresponding to the inode 422. The location of the inode file 541 for each volume is stored in a volume information ("VolumeInfo") block 542 associated with that volume. The VolumeInfo block 542 is a metadata container that contains metadata that applies to the volume as a whole. Examples of such metadata include, for example, the volume's name, its type, its size, any space guarantees to apply to the volume, and the VVBN of the inode file of the volume.

File system objects can be, for example, files, directories, subdirectories, and/or LUNs of the file system. File system object inodes are arranged sequentially in the inode file, and a file system object's position in the inode file is given by its inode number. An inode includes a master location catalog for the file, directory, or other file system object and various bits of information about the file system object called metadata. The metadata includes, for example, the file system object's creation date, security information such as the file system object's owner and/or protection levels, and its size. The metadata also includes a "type" designation to identify the type of the file system object. The type could be at least one of the following types: 1) a "file"; 2) a "directory"; 3) "unused"; or 4) "not yet known." Directory inodes include a directory entry for each file system object contained in the directory (referred to as "child" objects). Each directory entry then includes the name of the child file system object the directory entry references and the object's inode and generation numbers. In addition to inodes associated with file system objects, the file system may also maintain "unused" inodes for each inode number that is not associated with a file system object.

The metadata also includes the "generation number" of the file system object. As time goes by, file system objects are created or deleted, and slots in the inode file are recycled. When a file system object is created, its inode is given a new generation number, which is guaranteed to be different from (e.g., larger than) the previous file system object at that inode number (if any). If repeated accesses are made to the file system object by its inode number (e.g., from clients, applications, etc.), the generation number can be checked to avoid inadvertently accessing a different file system object after the original file system object was deleted. The metadata also includes "parent information," which includes the inode number of the file system object's parent directory. A file system object can have multiple parent directories.

For various reasons, it may be desirable to maintain a replica of a data set in the source storage system. For example, in the event of a power failure or other type of failure, data lost at the source storage system can be recovered from the replica stored in the destination storage system. In at least one embodiment, the data set is a file system of the storage system, and replication is performed using snapshots. A "snapshot" is a persistent image (usually read-only) of the file system at a point in time and can be generated by the snapshot differential module 12. At a point in time, the snapshot differential module 12 generates a first snapshot of the file system of the source storage system, referred to as the baseline snapshot. This baseline snapshot is then provided to the source replication engine 8A for a baseline replication process. The system executes the baseline replication process by generating a set of replication operations corresponding to the file system objects in the baseline snapshot. The replication operation will be executed on the destination storage system 2B to replicate the initial state of the storage system. The system may generate one or more replication operations for each file system object on the source storage system 2A. The replication operations may be sent in any arbitrary order and are not restricted to chronological order or the file system hierarchy. Subsequently, the snapshot differential module 12 generates additional snapshots of the file system from time to time.

At some later time, the source replication engine 8A executes another replication process (which may be at the request of the destination replication engine 8B). To do so, the source replication engine 8A needs to be updated with the changes to the file system of the source storage system since a previous replication process was performed. The snapshot differential module 12 compares the most recent snapshot of the file system of the source storage system to the snapshot of a previous replication process to determine differences between a recent snapshot and the previous snapshot. The snapshot differential module 12 identifies any data that has been added or modified since the previous snapshot operation, and sends those additions or modifications to the source replication engine 8A for replication. The source replication engine 8A then generates replication operations for each of the additions or modifications. The replication operations are transmitted to the destination replication engine 8B for execution on the destination storage system 2B. As with the baseline replication process, the replication operations may be sent in any arbitrary order.

A replication process transfers information about a set of replication operations from a source file system to the replica destination file system. In one embodiment, a replication operation includes data operations, directory operations, and inode operations. A "data operation" transfers 1) a block of file data, 2) the inode number of the block of data, 3) the generation number of the file, 4) the position of the block within the file (e.g., FBN), and 5) the type of the file. A "directory operation" transfers 1) the inode number of the directory, 2) the generation number of the directory, and 3) enough information to reconstitute an entry in that directory, including 1) the name, 2) inode number, and 3) generation number of the file system object the directory entry points to. Finally, an "inode operation" transfers 1) the metadata of an inode, 2) its inode number, and 3) the generation of the inode. To perform a replication of an entire file system, the source storage system sends a sequence of data operations, directory operations, and inode operations to the destination, which is expected to process the operations and send acknowledgments to the source. As used herein, the inode number (or numbers) in each replication operation is referred to as the "target inode number." A "destination inode" is an inode on the destination storage system having the same inode number as the target inode number in a received replication operation.

A replication of a file system may be either an "initialization," in which the destination file system starts from scratch with no files or directories, or an "update," in which the destination file system already has some files and directories from an earlier replication process of an earlier version of the source. In an update, the source file system does not need to send every file and directory to the destination; rather, it sends only the changes that have taken place since the earlier version was replicated. In an update, an inode operation may be used to indicate that a file has been deleted, and also possibly that another file has been created at the same inode number. Inode operations have various types, including delete (where the file system object associated with the inode number is deleted), create (where a new file system object is created at the target inode number), and modify (where the contents or metadata of the file system object are modified). Similarly, in an initialization, the system sends create and modify operations to build the file and directory structure.

As noted above, the destination storage system may receive the replication operations in an arbitrary order. This simplifies processing for the source replication engine 8A by allowing it to send replication operations as they are created, rather than imposing additional timing requirements. However, in many cases, the arbitrary order results in the destination replication engine 8B receiving replication operations that are inconsistent with the existing file system on the destination storage system. This may result when the source storage system deleted a file system object (freeing its inode) and created a new file system object having the same inode number. If the destination replication engine 8B receives the create operation before the delete operation, it determines that an inconsistency exists because the create operation is directed to an inode number that is already in use. An inconsistency may also result if the source storage system created a new file system object at an unused inode and later modified the inode. If the operations are received out of order, the destination replication engine 8B determines that an inconsistency exists because the modify operation is directed to an unused inode. This also occurs when the system receives a replication operation directed to a first inode type (e.g., a directory) while the target inode is a second inode type (e.g., a file). One possible solution would require the destination replication engine 8B to store the inconsistent operations until the corresponding delete operation is received. However, this would be inefficient and would defeat the purpose of providing the replication operations in an arbitrary order.

Figure 6:
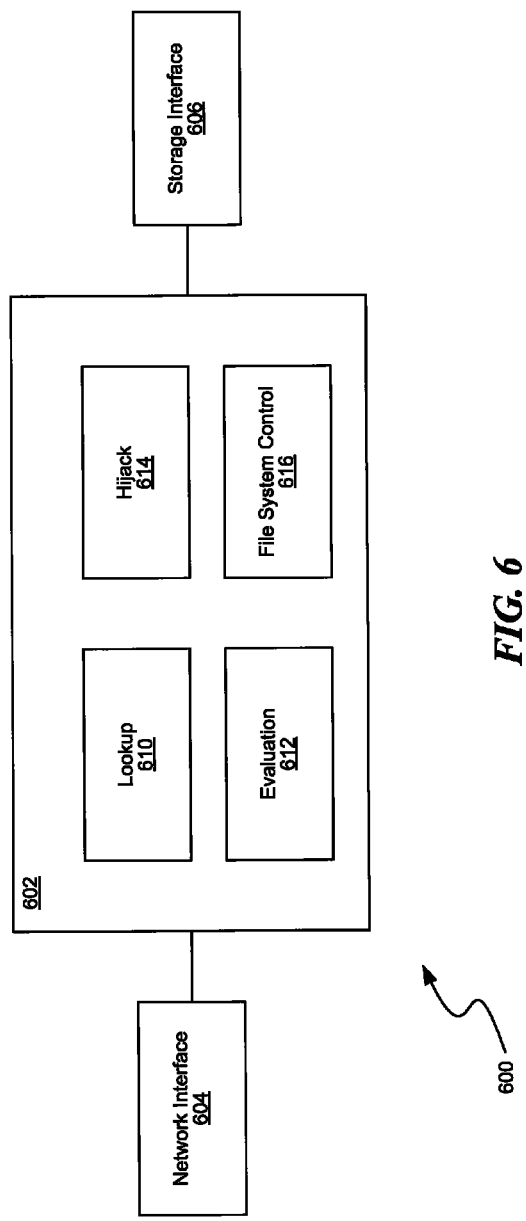
FIG. 6 is a logical block diagram of an inode hijack system.

Instead, the current system solves this problem by "hijacking" the target inode. As used herein, "hijacking" occurs when the destination replication engine 8B detects an inconsistency between the replication operation and the target inode and replaces metadata in the target inode with data from the replication operation. FIG. 6 illustrates a logical block diagram of the hijack system 600. The system 600 can be implemented by the destination replication engine 8B (FIG. 1) executing on the destination storage system or by other hardware that has access to the file system of the destination storage subsystem 4B. Aspects of the system may be implemented as special purpose hardware circuitry, programmable circuitry, or a combination of these. As will be discussed in additional detail herein, the system 600 includes a number of modules to facilitate the functions of the system. Although the various modules are described as residing in a single system, the modules are not necessarily physically co-located. In some embodiments, the various modules could be distributed over multiple physical devices, and the functionality implemented by the modules may be provided by calls to remote services. Similarly, the data structures could be stored in local storage or remote storage and distributed in one or more physical devices. Assuming a programmable implementation, the code to support the functionality of this system may be stored on a computer-readable medium such as an optical drive, flash memory, or a hard drive. One skilled in the art will appreciate that at least some of these individual components and subcomponents may be implemented using ASICs, PLDs, or a general-purpose processor configured with software and/or firmware.

As shown in FIG. 6, the system 600 includes a network interface 604, which is configured to receive replication operations from the source storage system 2A. The network interface 604 may be implemented using the network adapter 126 (FIG. 2). The system 600 also includes a storage interface 606, which is configured to communicate with a destination storage subsystem 4B to execute the replication operations and which can be the storage adapter 128 in FIG. 2.

The system 600 has a processing component 602, which processes received replication operations and controls the destination storage subsystem based on the operations. The processing component 602 could be implemented by the processor 130 of FIG. 2. As discussed above, each replication operation includes an inode number of a file system object that is created, modified, or deleted by the operation. For create operations, the replication operation may also include inode numbers of one or more parent inodes of the file system object to be created.

The processing component 602 includes a lookup component 610, which is configured to determine one or more destination inodes on the destination storage system corresponding to the target inode numbers in the replication operation. Thus, the lookup component 610 determines the target inode numbers based on the replication operation and accesses the file system to retrieve information stored in the corresponding destination inodes. This information includes file system object metadata, such as type, generation, creation date, modification date, etc.

The processing component 602 also includes an evaluation component 612, which is configured to detect an inconsistency between the replication operation and the destination inode. Based on the detected inconsistency, the evaluation component 612 determines that a replacement operation has occurred. As discussed above, an inconsistency exists when the system receives a replication operation that cannot properly be executed on the target inode. Inconsistencies may be detected for various reasons. Examples of inconsistencies include:

The system receives a create operation directed to an inode that already exists on the destination storage system 2B;

The system receives a replication operation including a target inode type that differs from the inode type of the corresponding destination inode;

The system receives a replication operation including a target inode generation number that differs from the generation number of the corresponding destination inode; and The system receives a replication operation that is inconsistent with the type of the destination inode (e.g., the replication operation adds data blocks while the corresponding destination inode is a directory, or the replication operation adds a directory entry while the corresponding destination inode is a file).

In a special case of the last example above, an inconsistency exists when the system receives a modify operation directed to an unused inode (i.e., an inode having a type of "unused"). This may occur during a replication process when the source storage system 2A generates a create operation and a modify operation directed to an unused inode and the modify operation is received before the create operation.

The processing component 602 includes a hijack component 614, which is configured to hijack the destination inode based on the information in the replication operation. During a hijack process, the system replaces metadata in the destination inode based on the metadata in the replication operation. The hijack operation often implicitly supersedes a delete operation that will arrive at some later point in the replication process. Thus, when the system receives a replication operation containing the delete operation at a later time, the system can ignore the operation. Optionally, the source storage system 2A may elect not to send the delete operation. Advantages of this include saving processing on the source storage system 2A and saving network bandwidth on the interconnect 6. During operation, the hijack component 614 frees any data blocks associated with the destination inode (if the destination inode is a file). In one embodiment, the hijack component 614 frees data blocks by modifying the destination inode to replace references to the data blocks with null references. The hijack component 614 may also direct the storage manager 10B to allow the data blocks to be written to. The hijack component 614 then replaces the file system metadata in the destination inode with metadata received in the replication operation. The hijack component 614 may also delete metadata that cannot be replaced based on the information in the received replication operation and/or replace the metadata with default values. The system can fill in the metadata at a later time when additional replication operations are received. This may occur, for example, during a baseline replication when the source replication engine 8A generates two separate operations directed at a specific inode number: a create operation and a modify operation. If the modify operation is received first, the system determines that an inconsistency exists because the modify operation is directed to an unused inode. However, the system may be unable to completely fill in the metadata associated with the new inode. In this situation, the hijack component 614 hijacks the destination inode and fills in the data included in the modify operation while erasing remaining data from the prior inode. The system 600 can then replace the remainder of the metadata when the create operation is received.

The processing component 602 also includes a file system control component 616, which is configured to execute various file system cleanup operations after the hijack process has been executed. In particular, the file system control component 616 is configured to invalidate any file handles that are currently pointing to the destination inode after it is hijacked. This is done because the hosts 1 frequently cache file handles pointing to a particular inode to avoid having to make repeated requests to the file system for a file handle. The file system control component 616 invalidates these file handles to avoid generating file system errors when the host 1 attempts to use the handle.

Figure 7:
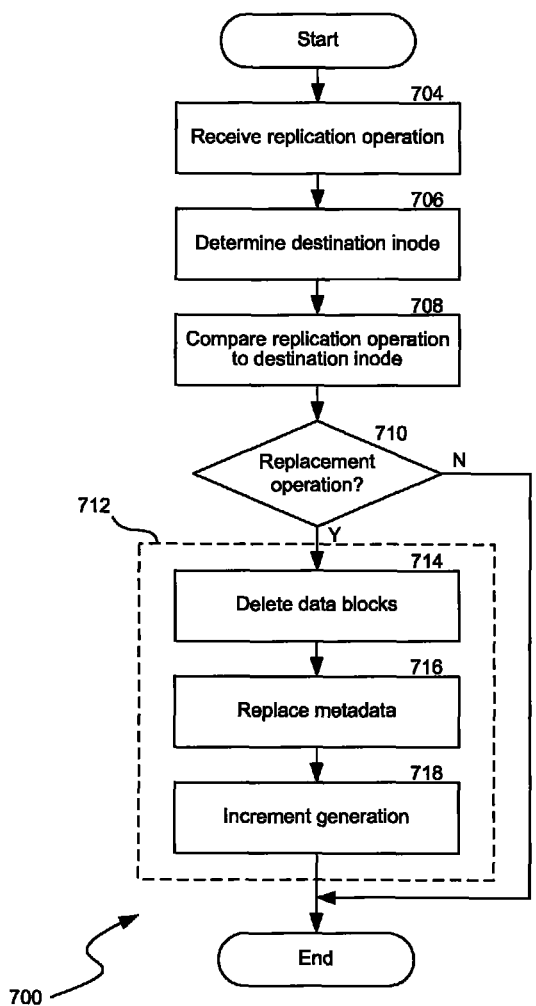
FIG. 7 is a flow chart of a process for executing the inode hijack system.
Figure 8:
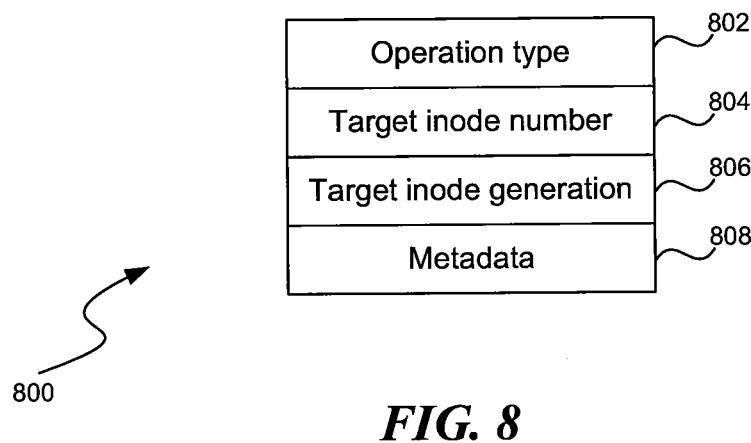
FIG. 8 is an example structure of a replication operation.

FIG. 7 is a flow chart of a process 700 for executing the inode hijack system, which may be executed by the system 600. The process 700 operates to detect inconsistencies in replication operations received through the network interface 604 and to hijack a destination inode where necessary. Processing begins in step 704, where the system receives a replication operation. As discussed above, replication operations are received in an arbitrary order that is not restricted by chronological order or file system hierarchy. FIG. 8 is an example structure of a replication operation. As shown in FIG. 8, the replication operation data structure includes information defining the replication operation, including the operation type 802, target inode number 804, target inode generation 806, and metadata associated with the operation 808 (e.g., create/modify time, inode type, and parent information). One skilled in the art will appreciate that the replication operation data structure may also include other fields as needed to support the replication process.

Processing then proceeds to step 706, where the system determines one or more destination inodes corresponding to the replication operation. As described above, this includes looking up inodes based on the target inode number(s). In some embodiments, the destination inodes include unused inodes corresponding to the target inode number(s). The system then provides the destination inodes to the remaining components in the system for processing.

Processing then proceeds to step 708, where it attempts to detect an inconsistency between the replication operation and the destination inode(s). As discussed above, the system may determine that an inconsistency exists based on the type of operation (e.g., a create operation directed to an existing inode, a modify operation directed to an unused inode, etc.). The system can also detect inconsistencies by comparing information in the destination inode(s) (e.g., inode generation, inode type, etc.) to information from the replication operation, where an inconsistency is identified if the information does not match. The system then proceeds to decision step 710, where it determines whether the replication operation is a replacement operation. A replacement operation is identified when the system has detected an inconsistency between the replication operation and the destination inode. If the system determines that the replication operation is not a replacement operation, the process 700 ends and the replication operation is executed.

If the system determines that the replication operation is a replacement operation, processing proceeds to subprocess 712, in which the system executes the hijack operation. In subprocess 712, the system hijacks the destination inode by replacing existing data with data from the replication operation. In particular, the system first proceeds to step 714, where it frees any data blocks associated with the destination inode if the destination inode is a file. As discussed above, the system frees data blocks by modifying the metadata in the destination inode to replace references to each data block with a null or default reference. The system may also notify the storage manager 10 that the data blocks can be reused. The processing of step 714 may be executed synchronously or asynchronously. In a synchronous operation, the process 700 pauses execution until every data block associated with the destination inode has been freed by the file system. Alternatively, in an asynchronous operation, the system does not have to wait for the file system to free each block. For an asynchronous operation, the system copies the data block references stored in the destination inode's buffer tree to a temporary file. The system then directs the file system to free the data associated with the temporary file as a background process. If the hijack operation is directed to a directory inode, the system may also delete the contents of the directory. In some embodiments, the system frees all data blocks within the directory. Alternatively, the system may delete the inodes for all file system objects within the directory. In this embodiment, the source storage system 2A can then omit delete operations directed to the file system objects within the directory, which reduces processing at the source storage system 2A and bandwidth use on the interconnect 6.

Processing then proceeds to step 716, where the system replaces the metadata in the destination inode with metadata from the replication operation. If the replication operation is a file create or file modify operation, this includes associating a new set of data blocks with the inode. The system may also erase any metadata associated with the original inode that is not directly replaced. As discussed above, in some cases the metadata needed to fully populate the target inode is contained in multiple replication operations. In order to avoid any inconsistency within the inode, the system erases the contents of the previous inode and/or replaces the contents with default values rather than having metadata from two distinct versions of the inode reside simultaneously in the same inode.

The system then proceeds to step 718, where it increments the generation number of the destination inode. As discussed above, the generation number allows hosts 1 to determine whether a file handle is pointing to the same inode that it originally referenced. If the generation numbers differ, the host knows that the handle is no longer valid (i.e., that the file system object previously referenced by the handle no longer exists). However, this step may be skipped in some cases where it is not necessary to change the generation number of the target inode. After incrementing the generation number, the process 700 ends.

In some cases the system receives multiple replication operations to fully populate the metadata for a particular inode. This may occur, for example, when the system receives a modify operation before it receives a create operation for the same inode (e.g., during a baseline replication). In these cases, the system replaces the inode's metadata where possible and replaces the remaining data with default values or erases the data. At a later time, the system receives a second replication operation that provides the remainder of the file system metadata. After determining that the second replication operation includes the remaining metadata, the system replaces the remaining data in the inode with data from the replication operation. For this type of operation, there is no hijack—i.e., the system does not free data blocks or change the generation number or type of the inode.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method for processing storage operations in a network storage system, the method comprising:
   receiving information defining multiple replication operations corresponding to changes on a source storage system for execution on a destination storage system in an arbitrary order, wherein the information defines a target metadata container identifier for each replication operation;
   detecting an inconsistency between an individual replication operation and a destination metadata container on the destination storage system, wherein the destination metadata container corresponds to the target metadata container identifier, wherein detecting the inconsistency comprises determining either that the replication operation is a create operation and the destination metadata container is not unused, or that the replication operation is a modify operation and the destination metadata container is unused;
   in response to detecting the inconsistency, determining that a replacement operation has occurred, wherein the replacement operation is a replication operation received in a chronologically different order from the order the corresponding change occurred on the source storage system; and
   in response to determining that the replacement operation has occurred, replacing a portion of a metadata section of the destination metadata container based on the replication operation without waiting for a later replication operation.

2. The method of claim 1, wherein the target metadata container identifier includes a target generation, wherein the destination metadata container includes a destination metadata container generation, and wherein detecting the inconsistency comprises comparing the target generation to the destination metadata container generation.

3. The method of claim 1, wherein each replication operation includes a target type, wherein the destination metadata container includes a metadata container type, and wherein detecting the inconsistency comprises comparing the metadata container type to the target type.

4. The method of claim 1, wherein the destination metadata container is a file and wherein replacing the portion of the metadata section comprises freeing a first set of metadata blocks associated with the file and associating a second set of metadata blocks determined based on the replication operation.

5. The method of claim 1, wherein replacing the portion of the metadata section comprises replacing a first subsection of the metadata section with metadata included in the individual replication operation and replacing a second section of the metadata section with a default value.

6. The method of claim 1, wherein the individual replication operation is a first replication operation, wherein replacing the portion of the metadata section comprises replacing a first subsection of the metadata section with metadata included in the first replication operation and erasing a second subsection of the metadata section or replacing the second subsection with a default value, and further comprising:
   replacing the second subsection of the metadata section based on metadata included in a second replication operation of the multiple replication operations.

7. The method of claim 1, wherein the arbitrary order is not based on chronological order or file system hierarchy.

8. An apparatus for processing storage operations in a storage system, the apparatus comprising:
   a storage interface configured to communicate with a destination storage system;
   a storage operation interface configured to receive information defining multiple replication operations corresponding to changes to a source storage system to be executed on the destination storage system provided in an arbitrary order from a remote device, wherein the information defines a target metadata container address for each replication operation; wherein the multiple replication operations include a first replication operation defining a modify operation directed to a metadata container type that differs from the matching metadata container type and a second replication operation defining a create operation;
   a processor;
   a memory;
   a lookup component configured to find a matching metadata container of a file system object on the destination storage system corresponding to an individual target metadata container address;
   an evaluation component configured to detect an inconsistency between an individual replication operation corresponding to the individual target metadata container address and the matching metadata container of the file system object and to determine based on the detection that the individual replication operation is a replacement operation, wherein the replacement operation is a replication operation received in a chronologically different order from the order the corresponding change occurred on the source storage system; and
   a hijack component configured to replace a part of the metadata in the matching metadata container based on an individual replication operation corresponding to the individual target metadata container address without waiting for a later replication operation; wherein the hijack component is further configured to:
      store metadata in a first part of the matching metadata container based on the first replication operation; and
      store metadata in a second part of the matching metadata container based on the second replication operation.

9. The apparatus of claim 8, wherein the storage operation interface is a network interface configured to receive the multiple replication operations from a source storage system.

10. The apparatus of claim 8, wherein:
   an individual target metadata container address of the target metadata container address includes a target metadata container indicator and a target metadata container generation;
   the matching metadata container includes a destination metadata container indicator, a destination metadata container generation, and a destination metadata container type; and
   the evaluation component is configured to detect an inconsistency if the destination metadata container indicator is the same as the target metadata container indicator and if the destination generation differs from the target generation or the destination metadata container type differs from the target metadata container type.

11. The apparatus of claim 8, wherein the hijack component is configured to replace the part of the metadata in the matching metadata container by:
freeing data blocks associated with the matching metadata container; and
storing metadata from the multiple replication operations into a metadata section of the matching metadata container.

12. The apparatus of claim 8, wherein the multiple replication operations are received asynchronously.

13. The apparatus of claim 8, further comprising a file system control component configured to invalidate a handle referencing the matching metadata container.

14. A method for replicating data in a destination network storage system, the method comprising:
receiving information defining multiple replication operations corresponding to changes on a source storage system, wherein the information specifies a target inode identifier, an operation type, and metadata for each replication operation;
determining a destination inode on the destination network storage system based on at least a portion of the target inode identifier for an individual replication operation, wherein the destination inode includes destination inode metadata;
detecting a replacement operation by comparing the destination inode metadata to at least one of the target inode identifier, the operation type, and the metadata, wherein a replacement operation exists when the individual replication operation cannot be executed on the destination inode, and wherein the replacement operation is a replication operation received in a chronologically different order from the order the corresponding change occurred on the source storage system; and
in response to detecting the replacement operation, storing at least a part of the destination inode metadata in the destination inode with the metadata associated with the target inode identifier without waiting for a later replication operation;
wherein the replacement operation is a create operation directed to an inode that already exists on the destination network storage system, or a modify operation directed to an unused inode, or a replication operation including a target inode type that differs from an inode type of a corresponding destination inode, or a replication operation including a target inode generation number that differs form a generation number of the corresponding destination inode, or a replication operation that is inconsistent with the type of the destination inode;
wherein the individual replication operation is a first replication operation, wherein the operation type is a modify operation directed to an inode type that differs from a type of the destination inode, wherein storing at least part of the metadata comprises storing a part of the metadata in a first section of the destination inode, wherein the information defining multiple replication operations includes a second replication operation having a create type, and further comprising:
storing metadata in a second section of the destination inode based on the second replication operation.

15. The method of claim 14, wherein the destination inode is a first inode type and the replication operation is directed to a second inode type, wherein the second inode type differs from the first inode type.

16. The method of claim 14, further comprising:
receiving information defining a second replication operation, wherein the information defines a delete operation applied to the target node identifier; and
discarding the information defining the second replication operation without executing the second replication operation.

17. The method of claim 14, wherein the target inode identifier includes a target inode indicator, a target inode generation, and a target inode type, wherein the destination inode includes a destination inode indicator, a destination inode generation, and a destination inode type, and wherein a replacement operation is detected if the destination inode indicator is the same as the target inode indicator and if the destination inode generation differs from the target inode generation or the destination inode type differs from the target inode type.

18. The method of claim 14, wherein storing at least part of the metadata comprises:
freeing data blocks associated with the destination inode; and
storing the at least part of the metadata into a metadata section of the destination inode.

19. An apparatus for replicating data in a storage system, the apparatus comprising:
a network interface configured to receive information defining multiple replication operations in an arbitrary order, the multiple replication operations corresponding to changes on a source storage system;
a memory;
a processor coupled to the memory;
an evaluation component configured to detect an inconsistency between an individual replication operation and a destination inode in the storage system and to determine that the individual replication operation is a replacement operation based on the inconsistency, wherein the replacement operation is a replication operation received in a chronologically different order from the order the corresponding change occurred on the source storage system; and
a hijack component configured to replace metadata in the destination inode based on the individual replication operation without waiting for a later replication operation;
wherein the multiple replication operations include a modify operation and a create operation, and wherein the hijack component is further configured to:
store metadata in a first part of the matching metadata container based on the modify operation; and
store metadata in a second part of the matching metadata container based on the create operation.

20. The apparatus of claim 19, further comprising a lookup component configured to determine the destination inode based on metadata in the individual replication operation.

21. The apparatus of claim 19, wherein the evaluation component is configured to detect the inconsistency by determining that the individual replication operation is directed to a first inode type and the destination inode is a second inode type, wherein the second inode type differs from the first inode type.

22. The apparatus of claim 19, wherein the evaluation component is configured to replace the metadata by:
freeing a set of data blocks associated with the destination inode;
copying metadata from the replication operation into a metadata section of the destination inode; and modifying a generation number associated with the destination inode.

\* \* \* \* \*

UNITED STATES PATENT AND TRADEMARK OFFICE
CERTIFICATE OF CORRECTION

PATENT NO. : 8,671,072 B1
APPLICATION NO. : 12/559483
DATED : March 11, 2014
INVENTOR(S) : Devang K. Shah et al.

Page 1 of 1

It is certified that error appears in the above-identified patent and that said Letters Patent is hereby corrected as shown below:

In the Specification

In column 2, line 60, delete "inode," and insert -- inode --, therefor.

In the Claims

In column 17, line 50, in claim 14, delete "form" and insert -- from --, therefor.

In column 18, line 4, in claim 16, delete "node" and insert -- inode --, therefor.

Signed and Sealed this
Twenty-fourth Day of June, 2014

Michelle K. Lee
*Deputy Director of the United States Patent and Trademark Office*